(12) United States Patent
Wu

(10) Patent No.: US 6,600,102 B1
(45) Date of Patent: Jul. 29, 2003

(54) WIRE CONNECTION DEVICE OF CEILING LAMP CAPABLE OF BEING ASSEMBLED BY USERS

(76) Inventor: Wen-Chang Wu, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/042,455

(22) Filed: Jan. 10, 2002

(51) Int. Cl.⁷ .................................................. H02G 3/08
(52) U.S. Cl. ............................. 174/50; 174/61; 174/63; 174/58; 220/3.2
(58) Field of Search ............................. 174/50, 61, 62, 174/53, 54, 58, 48, 63, 65 R; 220/3.2, 3.4, 3.5, 3.6, 3.7, 3.8, 241; 439/537; 248/343

(56) References Cited

U.S. PATENT DOCUMENTS

| | | | | |
|---|---|---|---|---|
| 1,040,175 A | * | 10/1912 | Earhart .......................... 174/62 |
| 3,798,584 A | * | 3/1974 | Person .......................... 174/62 |
| 4,062,512 A | * | 12/1977 | Arnold .......................... 174/63 |
| 4,770,311 A | * | 9/1988 | Wang .......................... 220/3.2 |
| 4,919,292 A | * | 4/1990 | Hsu .............................. 174/61 |
| 5,009,383 A | * | 4/1991 | Chapman .................... 248/343 |
| 5,303,894 A | * | 4/1994 | Deschamps et al. ........ 248/343 |
| 5,560,101 A | * | 10/1996 | Sandell et al. ................ 174/48 |
| 5,606,147 A | * | 2/1997 | Deschamps et al. .......... 174/48 |
| 5,725,190 A | * | 3/1998 | Cuthbertson et al. ....... 248/343 |
| 5,900,583 A | * | 5/1999 | Russo .......................... 174/61 |
| 5,939,671 A | * | 8/1999 | Gretz .......................... 174/50 |
| 6,238,239 B1 | * | 5/2001 | Wu .............................. 174/50 |
| 6,335,486 B1 | * | 1/2002 | Reiker ........................ 174/51 |
| 6,441,302 B1 | * | 8/2002 | Wu .............................. 174/50 |
| 6,455,775 B1 | * | 9/2002 | Wu .............................. 174/54 |

* cited by examiner

Primary Examiner—Dean A. Reichard
Assistant Examiner—Angel R. Estrada

(57) ABSTRACT

A wire connection device is used in a ceiling lamp. The connection device comprises a retaining seat engaged to a wire box and an inserting rod inserted into an interior of the retaining seat. A plurality of via holes are formed around a periphery of the wire box. A lateral side of the retaining seat extends with an engaging portion, and a polygonal inserted hole is formed in the engaging portion. The engaging portion is inserted into the wire box. The retaining seat has a step-like receiving hole; the receiving hole being installed with a buckling unit for buckling the inserting rod. A portion of the inserting rod is a polygonal rod; a lateral side the polygonal rod has a buckling hole which is aligned to the receiving hole of the retaining seat; and the buckling hole exactly resists against the buckling unit.

6 Claims, 3 Drawing Sheets

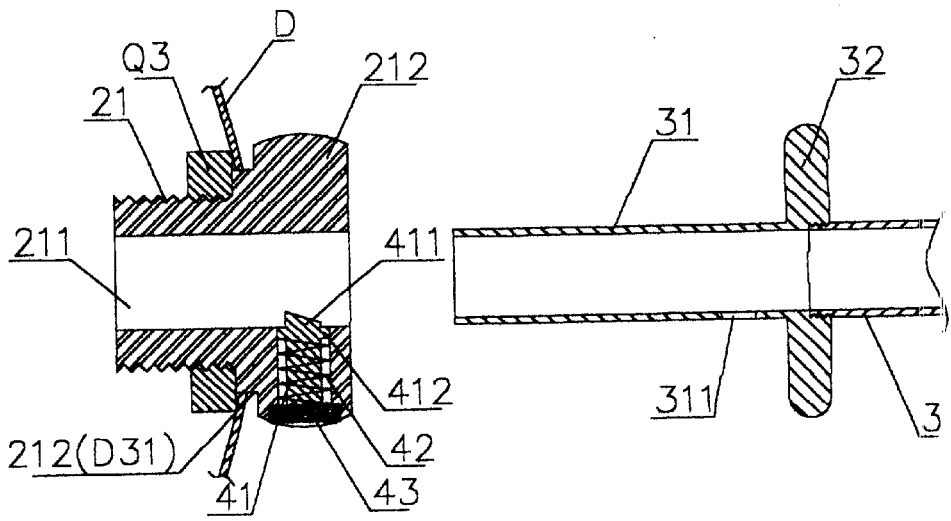
FIG3-A
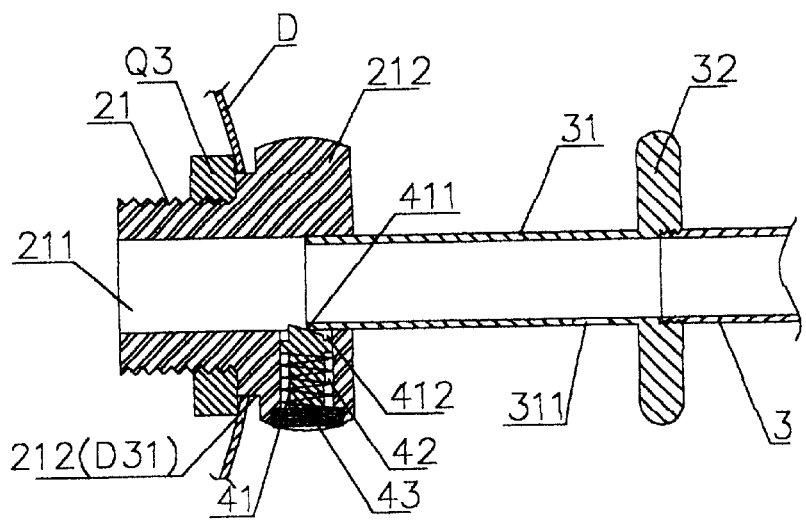
FIG3-B
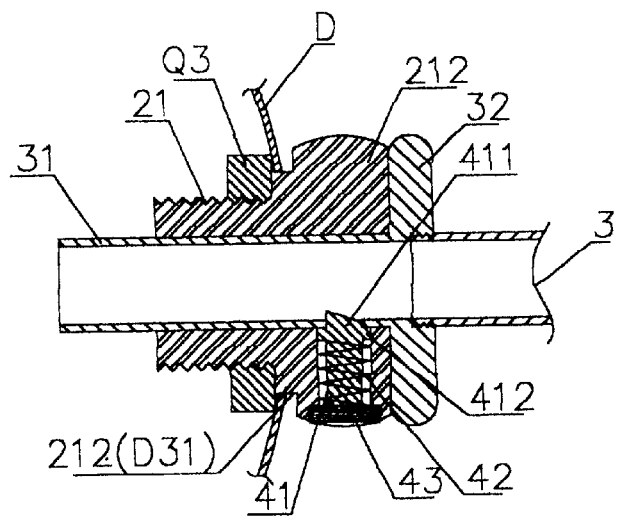
FIG3-C

WIRE CONNECTION DEVICE OF CEILING LAMP CAPABLE OF BEING ASSEMBLED BY USERS

BACKGROUND OF THE INVENTION

1. Field of the Invention

The present invention relates to wire fixing structure of a lamp, and particularly to wire connection device of a ceiling lamp capable of being assembled by users which can be assembled by the user himself (or herself).

2. Description of Related Art

Prior wire connection devices of lamps, such as wall lamps, stand type lamps, ceiling lamps, use studs and nuts to lock the components. In assembly, not only the user is easy to be harmed, but also other locking tools (such as spanners, openers, etc.) are necessary. Moreover, in assembly, electric wires are easy to expose out and some dangers are induced. Thereby, the prior art is not suitable to be assembled by the user. In general, the manufacturer assembles the device in advance, namely, the wire box is assembled with inserting rods in the manufacturing process. However, this will induce that a large space is required for transferring and storing the wire connection device and thus cost is increased.

SUMMARY OF THE INVENTION

Accordingly, the primary object of the present invention is to provide self-assembled ceiling lamp wire connection device, wherein an inserting rod can be pulled out from the wire box for being packed, transferred, or stored. Since the wire box and inserting rod can be detached, the space required in transferring and storage is greatly reduced. Moreover, the retaining seat for retaining the inserting rod is assembled in the interior of the wire box in advance. The user only needs to insert the inserting rod into the retaining seat in the wire box without using studs. As a result, the user may assembly the present invention by himself (or herself).

To achieve above objects, the present invention provides a wire connection device of a ceiling lamp capable of being assembled by users, wherein the device comprises a retaining seat engaged to the wire box and an inserting rod inserted into an interior of the retaining seat. A plurality of via holes are formed around a periphery of the wire box. A lateral side of the retaining seat extends with an engaging portion, and a polygonal inserted hole is formed in the engaging portion. The engaging portion is inserted into the wire box. The retaining seat has a step-like receiving hole; the receiving hole being installed with a buckling unit for buckling the inserting rod. A portion of the inserting rod is a polygonal rod. A lateral side the polygonal rod has a buckling hole which is aligned to the receiving hole of the retaining seat; and the buckling hole exactly resists against the buckling unit. Thereby, a user can assembly the device by himself (or herself).

The various objects and advantages of the present invention will be more readily understood from the following detailed description when read in conjunction with the appended drawing.

BRIEF DESCRIPTION OF THE DRAWINGS

FIG. 3-A is a plane cross sectional view of the inserting rod of the present invention in a normal condition.

FIG. 3-B is a plane cross sectional view of the inserting rod of the present invention which is being inserted into the retaining seat.

FIG. 3-C is a plane cross sectional view of the inserting rod of the present invention after being inserted into the retaining seat.

DETAILED DESCRIPTION OF THE PREFERRED EMBODIMENTS

Figure 1:
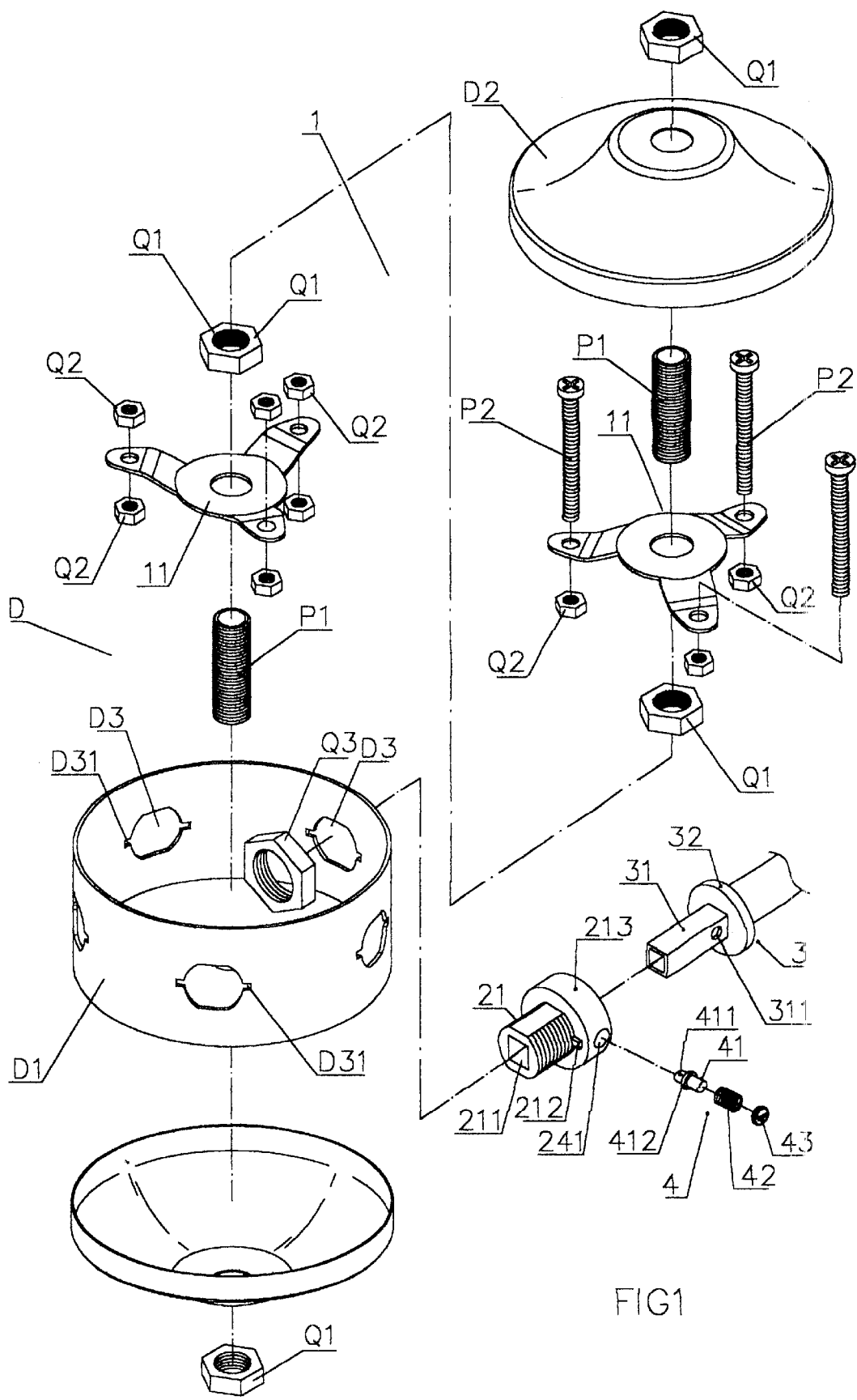
FIG. 1 is an exploded perspective view of the present invention.
Figure 2:
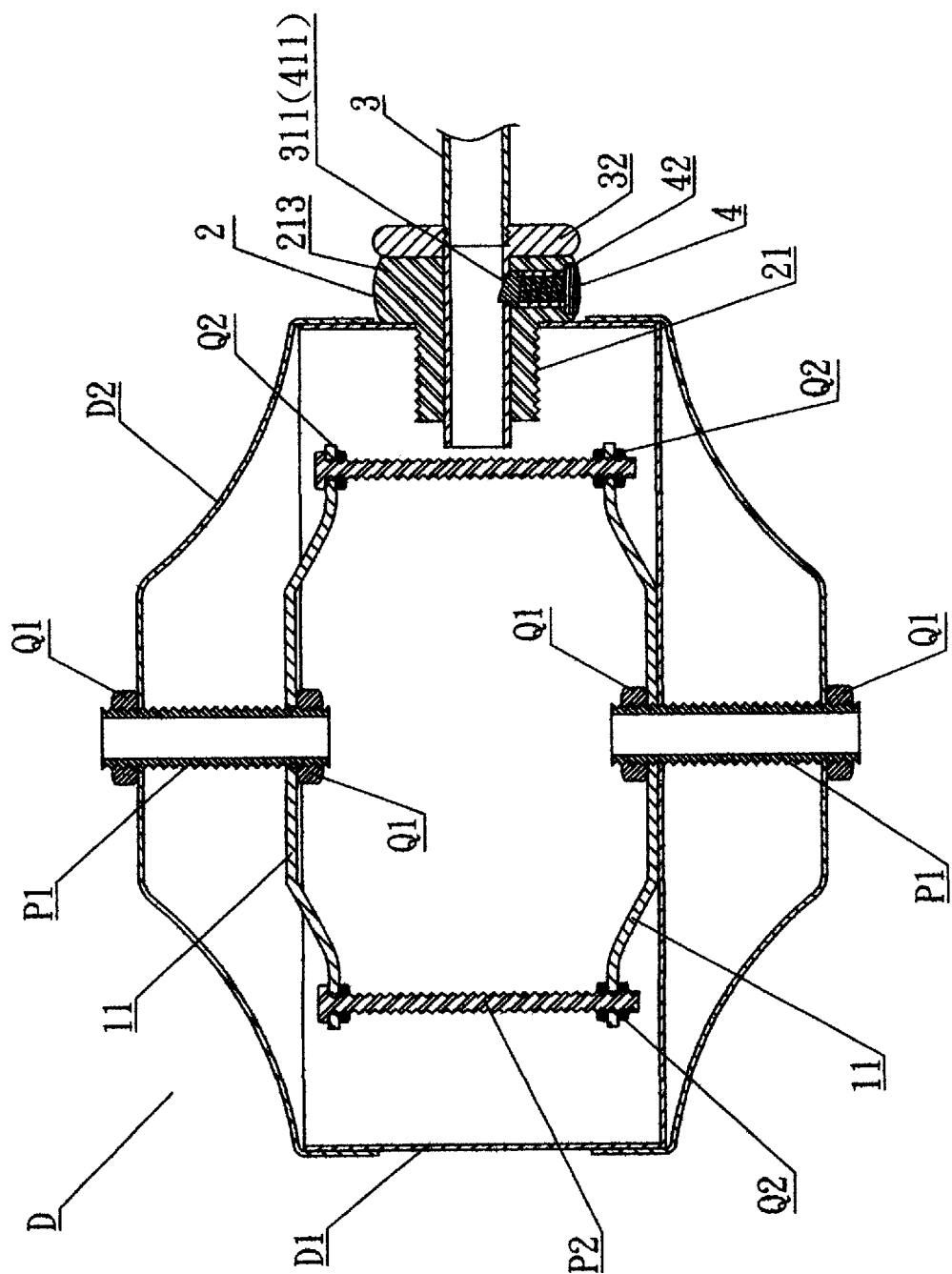
FIG. 2 is a plane cross sectional view of the wire box of the present invention.

Referring to FIGS. 1 and 2, the structure of the present invention is illustrated. The wire connection device of the present invention is illustrated. The wire connection device comprises a locking structure 1 for fixing a body D1 of a wire box D and a cover D2, a retaining seat 2 engaged to the wire box D and an inserting rod 3

The wire box D is formed by a body D1 and covers D2. The periphery of the body D1 of the wire box D is formed with a plurality of via holes D3 having buckling grooves D31 at two sides thereof. The body D1 and covers D2 are firmly secured to the locking structure 1.

The locking structure 1 is formed by two pieces of disk-like washers 11 which are engaged by screwing. A screw rod P1 passes through the disk-like washers 11 and then nuts Q1 are used to fix the screw rod P1. Furthermore, studs P2 and nuts Q2 are further used to fix the disk-like washers 11 from a reverse direction for passing the screw rod P1. Thereby, the interior of the wire box D has a large space so that electric wires can be inserted therein.

The lateral side of the retaining seat 2 is extended with an engaging portion 21 having a size exactly passing through the buckling groove D31 of the via hole D. The engaging portion 21 is formed with an inserted hole 211. Two sides of the engaging portion 21 are formed with two resisting blocks 212 at positions corresponding to those of the buckling grooves D31 of the via hole D. The inner side of the wire box D has positioning nuts Q3. Thereby, (the retaining seat 2 can be positioned at an outer side of the wire box D9 The larger a ring surface 213 of the retaining seat 2 has a stepped receiving hole 241 for being assembled with a buckling unit 4.

The buckling unit 4 is formed by a push rod 41 with a larger ring 412 at a middle section thereof, a spring 42 engaged around the push rod 41, and a stopping ring 43 locked to the retaining seat 2 for retaining the push rod 41 and the spring 42 to the retaining seat 2. An end portion of the push rod 41 exactly protrudes to the interior of the inserted hole 211 of the retaining seat 2. The larger ring 412 resists against the step-like surface of the receiving hole 241 for preventing the push rod 41 from entering into the inserted hole 211.

A portion of the inserting rod 3 inserting into the inserted hole 211 of the retaining seat 2 is a rectangular rod 31. A buckling hole 311 is formed at a lateral side of the rectangular rod 31 at a position corresponding to the receiving hole 214 of the retaining seat 2. The buckling hole 311 exactly resists against the lateral sides of the buckling unit 4. A predetermined portion of the inserting rod 3 has a resisting surface 32. After the buckling unit 4 is inserted into the buckling hole 311, the resisting surface 32 exactly resists against the distal end of the retaining seat 2 for making the inserting rod 3 stable without vibration.

The assembly of the inserting rod 3 and the wire box D will be described in the following. Referring to FIG. 3, in a normal condition of the wire box D, the push rod 41 of the buckling unit 4 slightly protrudes from the interior of the inserted hole 211 (referring to FIG. 3-A).

When the inserting rod 3 inserts into the inserted hole 211 of the retaining seat 2, the inserting rod 3 exactly resists against the push rod 41 of the buckling unit 4 so that the larger ring surface 412 of the push rod 41 exactly resists against the compressible spring 42 so as to prevent from moving backwards. Thereby, the inserting rod 3 can be inserted into the inserted hole 211 successfully (referring to FIG. 3-B).

When the buckling hole 311 of the inserting rod 3 aligns to the buckling unit 4. The push rod 41 of the buckling unit 4 is ejected by the spring 42 so as to insert into the buckling hole 311. Thereby, the inserting rod 3 is buckled by the buckling unit 4 and thus it can not move backwards. Thereby, the inserting rod 3 is confined by the retaining seat 2 (referring to FIG. 3-C).

In the present invention, the inserting rod 3 can be pulled out from the wire box D for being packed, transferred, or stored. Since the wire box D and inserting rod 3 can be detached, the space required in transferring and storage is greatly reduced. Moreover, the retaining seat 2 for retaining the inserting rod 3 is assembled in the interior of the wire box D in advance. The user only needs to insert the inserting rod 3 into the retaining seat 2 in the wire box D without using studs. As a result, the user may assembly the present invention by himself (or herself).

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wire connection device of a ceiling lamp capable of being assembled by users, the wire connection device comprising a retaining seat engaged to a wire box and an inserting rod inserted into an interior of the retaining seat wherein a plurality of via holes are formed around a periphery of the wire box, a locking device is installed within the wire box by studs and nuts;

a lateral side of the retaining seat extends with an engaging portion, a polygonal inserted hole is formed in the engaging portion; the engaging portion is inserted into the wire box; a positioning nut at an inner side of the wire box of the engaging portion locks the retaining seat in the interior of the wire box; the retaining seat has a larger lateral surface which has a step-like receiving hole; the receiving hole is installed with a buckling unit for buckling the inserted rod; and a portion of the inserting rod inserting into the inserted hole of the retaining seat is a polygonal rod; a lateral side of the polygonal rod has a buckling hole which is aligned to the receiving hole of the retaining seat; and the buckling hole exactly resists against the buckling unit;

thereby, only a small volume is required for transferring and storing the wire connection device, and a user can assembly the device by himself or herself.

2. The wire connection device of a ceiling lamp capable of being assembled by users as claimed in claim 1, wherein the buckling unit is formed by a push rod with a larger ring at a middle section thereof, a spring engaged around the push rod, and a stopping ring which is locked to the retaining seat and for retaining the push rod and the spring to the retaining seat; an end portion of the push rod exactly protrudes to an interior of the inserted hole of the retaining seat; the larger ring resists against the step-like surface of the receiving hole for preventing the push rod from entering into the inserted hole.

3. The wire connection device of a ceiling lamp capable of being assembled by users as claimed in claim 1, each of the via holes of the wire box has buckling grooves at two sides thereof; two sides of the engaging portion are formed with two resisting blocks at positions corresponding to those of the buckling grooves of the via hole.

4. The wire connection device of a ceiling lamp capable of being assembled by users as claimed in claim 1, wherein a predetermined portion of the inserting rod has a resisting surface; after the buckling unit is inserted into the buckling hole, the resisting surface exactly resists against a distal end of the retaining seat, thereby, the inserting rod is stable without vibration.

5. The wire connection device of a ceiling lamp capable of being assembled by users as claimed in claim 1, wherein the inserted hole of the engaging portion has a shape selected from one of a group containing a round shape, a triangular shape, a rectangular shape, and a pentagonal shape.

6. A wire connection device of a ceiling lamp capable of being assembled by users, the wire connection device comprising a locking structure for fixing a body of a wire box, the wire box has a cover; a retaining seat engaged to the wire box and an inserting rod inserted into an interior of the retaining seat wherein a plurality of via holes are formed around a periphery of the wire box, a locking device is installed within the wire box by studs and nuts; and the locking structure is formed by two pieces of disk-like washers which are engaged by screwing; a screw rod passes through the disk-like washers and then nuts are used to fix the screw rod from two ends of the screw rod; studs and nuts are further used to fix the disk-like washers from a reverse direction of the screw rod so as to be connected to the body and the cover of the wire box;

wherein the interior of the wire box has a large space so that electric wires can be inserted therein.

* * * * *